US010725782B2

(12) United States Patent
Krishna et al.

(10) Patent No.: US 10,725,782 B2
(45) Date of Patent: Jul. 28, 2020

(54) PROVIDING VARIABLE INTERPRETATION OF USEFULNESS INDICATORS FOR MEMORY TABLES IN PROCESSOR-BASED SYSTEMS

(71) Applicant: QUALCOMM Incorporated, San Diego, CA (US)

(72) Inventors: Anil Krishna, Lakeway, TX (US); Yongseok Yi, Cary, NC (US); Eric Rotenberg, Raleigh, NC (US); Vignyan Reddy Kothinti Naresh, Morrisville, NC (US); Gregory Michael Wright, Chapel Hill, NC (US)

(73) Assignee: Qualcomm Incorporated, San Diego, CA (US)

( * ) Notice: Subject to any disclaimer, the term of this patent is extended or adjusted under 35 U.S.C. 154(b) by 47 days.

(21) Appl. No.: 15/701,926

(22) Filed: Sep. 12, 2017

(65) Prior Publication Data

US 2019/0079772 A1  Mar. 14, 2019

(51) Int. Cl.
*G06F 12/00* (2006.01)
*G06F 9/38* (2018.01)
(Continued)

(52) U.S. Cl.
CPC .......... *G06F 9/3832* (2013.01); *G06F 9/3808* (2013.01); *G06F 9/3848* (2013.01);
(Continued)

(58) Field of Classification Search
CPC .... G06F 9/3832; G06F 9/3848; G06F 9/3808; G06F 12/123; G06N 3/063; G06N 5/02; G06N 20/00
See application file for complete search history.

(56) References Cited

U.S. PATENT DOCUMENTS 5,881,266 A    3/1999  Matsumoto
7,120,751 B1  10/2006  Endo et al.
(Continued)

OTHER PUBLICATIONS

International Search Report and Written Opinion for International Patent Application No. PCT/US2018/047043, dated Dec. 14, 2018, 13 pages.

*Primary Examiner* — Kalpit Parikh (74) *Attorney, Agent, or Firm* — Withrow & Terranova (57) ABSTRACT

Providing variable interpretation of usefulness indicators for memory tables in processor-based systems is disclosed. In one aspect, a memory system comprises a memory table providing multiple memory table entries, each including a usefulness indicator. A memory controller of the memory system comprises a global polarity indicator representing how the usefulness indicator for each memory table entry is interpreted and updated by the memory controller. If the global polarity indicator is set, the memory controller interprets a value of each usefulness indicator as directly corresponding to the usefulness of the corresponding memory table entry. Conversely, if the global polarity indicator is not set, the polarity is reversed such that the memory controller interprets the usefulness indicator value as inversely corresponding to the usefulness of the corresponding memory table entry. In this manner, the interpretation and updating of usefulness indicators by the memory controller can be varied using the global polarity indicator.

20 Claims, 6 Drawing Sheets

(51) Int. Cl.
*G06N 3/063* (2006.01)
*G06N 5/02* (2006.01)
*G06F 12/123* (2016.01)
*G06N 20/00* (2019.01)

(52) U.S. Cl.
CPC ........... *G06F 12/123* (2013.01); *G06N 3/063* (2013.01); *G06N 5/02* (2013.01); *G06N 20/00* (2019.01)

(56) References Cited

U.S. PATENT DOCUMENTS

| | | | |
|---|---|---|---|
| 2006/0143393 A1* | 6/2006 | Petev | G06F 12/122 711/133 |
| 2008/0320230 A1* | 12/2008 | Vishin | G06F 12/0817 711/141 |
| 2009/0063776 A1 | 3/2009 | Williams | |
| 2009/0190389 A1* | 7/2009 | Terzioglu | G11C 7/18 365/154 |
| 2011/0010502 A1 | 1/2011 | Wang et al. | |
| 2014/0168244 A1 | 6/2014 | Akenine-Moller et al. | |
| 2015/0067264 A1 | 3/2015 | Eckert et al. | |
| 2015/0074381 A1 | 3/2015 | Bose et al. | |
| 2015/0186274 A1* | 7/2015 | Kass | G06F 12/0808 711/135 |
| 2015/0332170 A1 | 11/2015 | Sharma | |
| 2016/0306632 A1 | 10/2016 | Bouzguarrou | |

\* cited by examiner

PROVIDING VARIABLE INTERPRETATION OF USEFULNESS INDICATORS FOR MEMORY TABLES IN PROCESSOR-BASED SYSTEMS

BACKGROUND

I. Field of the Disclosure

The technology of the disclosure relates generally to usefulness indicators used by memory tables in processor-based systems, and, in particular, to maintaining the effectiveness of such usefulness indicators.

II. Background

Caches and prediction logic employed in many processor-based systems, such as high performance central processing units (CPUs) and graphical processing units (GPUs), often use large static random access memory (SRAM) banks to store state data needed for operation. SRAMs are used in these types of devices because they offer density and power advantages over other structures (e.g., flip-flops or flop-trays, as non-limiting examples) which occupy more processor chip area and consume more power in comparison. Memory tables stored in such SRAM banks may hold hundreds or thousands of individual logical memory table entries, and thus may require careful management of the state data stored therein to be effective.

Many SRAM state management policies rely on a notion of "usefulness" for each memory table entry in a memory table stored in the SRAM. Under a "usefulness" approach, each memory table entry maintains a small "usefulness" indicator (e.g., a bit field providing two (2) to three (3) bits). A memory controller implementing an SRAM state management policy increments the usefulness indicator of a memory table entry whenever the memory table entry proves valuable (e.g., when the memory table entry provides a good prediction or prefetch suggestion). The usefulness indicator is likewise decremented in response to each misprediction or invalid prefetch suggestion that occurs. The value of the usefulness indicator at a given time thus represents a measure of the usefulness of the memory table entry. For example, in implementations in which the value of each usefulness indicator is considered to directly correlate with the usefulness of the corresponding memory table entry, a memory table entry with a usefulness indicator of two (2) bits having a value of 0b00 or 0b01 would be considered less useful than a memory table entry with a usefulness indicator having a value of 0b10 or 0b11.

However, usefulness indicators may also incur a number of disadvantages. Because memory tables tend to retain only the more useful entries, over time the differentiation among the usefulness indicators of the memory table entries decreases. This is because, when every memory table entry indicates that it is useful, the usefulness indicators themselves become less useful. Conventional solutions to this issue attempt to recalibrate the usefulness indicators across all memory table entries in one or more memory tables. For example, some approaches involve shifting each usefulness indicator to the right by one (1) bit, flash-clearing all usefulness indicator entries within a memory table to reset all memory table entries to the same initial state, or clearing a single bit within the usefulness indicator of each memory table entry. All of these potential solutions require multiple (e.g., often thousands) of memory table entries to be written within a very short period of time, which may be impracticable when using memory devices such as SRAMs. This issue may be mitigated by storing the usefulness indicators within separate additional SRAM or registers, but at the cost of additional processor chip area and power consumption. Consequently, it is desirable to provide a technique for recalibrating the usefulness indicators without requiring additional SRAM or registers to store the usefulness indicators, without incurring the area and power overhead of existing solutions, and without negatively impacting system performance.

SUMMARY OF THE DISCLOSURE

Aspects according to the disclosure include providing variable interpretation of usefulness indicators for memory tables in processor-based systems. In this regard, in one aspect, a processor-based system includes a memory system that comprises a memory table (e.g., a table storing state data within a static random access memory (SRAM), as a non-limiting example). In some aspects, the memory system may comprise or be part of a cache, a branch predictor, a value predictor, a load address predictor, and/or a hardware data prefetcher, as non-limiting examples. The memory table is made up of multiple memory table entries, each of which includes a usefulness indicator. The memory system further includes a memory controller (for example, an SRAM controller) that provides a global polarity indicator. Some aspects may provide that the global polarity indicator is a single-bit field representing a Boolean value. The global polarity indicator represents a present polarity that indicates how the usefulness indicator for each memory table entry is interpreted and updated by the memory controller. For example, in some aspects, if the global polarity indicator is set, the usefulness indicator of a given memory table entry is interpreted in the conventional fashion, whereby a value of the usefulness indicator directly corresponds to the usefulness of the corresponding memory table entry. Thus, a higher usefulness indicator value indicates a higher level of usefulness, and the usefulness indicator is incremented when the corresponding memory table entry proves valuable, and is decremented otherwise. Conversely, if the global polarity indicator is not set, the polarity is reversed such that the memory controller interprets the usefulness indicator value as inversely corresponding to the usefulness of the corresponding memory table entry. A higher usefulness indicator value therefore is indicative of a lower level of usefulness, and the usefulness indicator is decremented when the corresponding memory table entry proves valuable, and is incremented otherwise. In this manner, the memory controller selects memory table entries for replacement and updates the usefulness indicator based on the interpretation of the usefulness indicators indicated by the global polarity indicator.

In another aspect, a memory system of a processor-based system is provided. The memory system includes a memory table comprising a plurality of memory table entries each providing a usefulness indicator, and further comprises a memory controller providing a global polarity indicator. The memory controller is configured to, responsive to determining that replacement from the memory table is necessary, determine whether the global polarity indicator is not set. The memory controller is further configured to, responsive to determining that the global polarity indicator is not set, interpret a value of the usefulness indicator of each memory table entry of the plurality of memory table entries of the memory table as inversely correlating to a usefulness of the memory table entry. The memory controller is also configured to, responsive to determining that the global polarity indicator is set, interpret the value of the usefulness indicator of each memory table entry of the plurality of memory table entries of the memory table as directly correlating to the usefulness of the memory table entry. The memory controller is additionally configured to select a least useful memory table entry of the plurality of memory table entries for replacement based on the interpreted value of the usefulness indicator of each memory table entry of the plurality of memory table entries of the memory table.

In another aspect, a memory system of a processor-based system is provided. The memory system comprises a means for determining that replacement of a memory table entry of a plurality of memory table entries of a memory table is necessary. The memory system further comprises a means for determining whether a global polarity indicator is not set, responsive to determining that replacement of a memory table entry is necessary. The memory system also comprises a means for interpreting a value of a usefulness indicator of each memory table entry of the plurality of memory table entries of the memory table as inversely correlating to a usefulness of the memory table entry, responsive to determining that the global polarity indicator is not set. The memory system additionally comprises a means for selecting a least useful memory table entry of the plurality of memory table entries for replacement based on the interpreted value of the usefulness indicator of each memory table entry of the plurality of memory table entries of the memory table.

In another aspect, a method for providing variable interpretation of memory table usefulness indicators is provided. The method comprises determining, by a memory controller of a processor-based system, that replacement of a memory table entry of a plurality of memory table entries of a memory table is necessary. The method further comprises, responsive to determining that replacement of a memory table entry is necessary, determining whether a global polarity indicator is not set. The method also comprises, responsive to determining that the global polarity indicator is not set, interpreting a value of a usefulness indicator of each memory table entry of the plurality of memory table entries of the memory table as inversely correlating to a usefulness of the memory table entry. The method additionally comprises selecting a least useful memory table entry of the plurality of memory table entries for replacement based on the interpreted value of the usefulness indicator of each memory table entry of the plurality of memory table entries of the memory table.

In another aspect, a non-transitory computer-readable medium is provided. The non-transitory computer-readable medium stores thereon computer-executable instructions which, when executed by a processor, cause the processor to determine that replacement of a memory table entry of a plurality of memory table entries of a memory table is necessary. The computer-executable instructions further cause the processor to, responsive to determining that replacement of a memory table entry is necessary, determine whether a global polarity indicator is not set. The computer-executable instructions also cause the processor to, responsive to determining that the global polarity indicator is not set, interpret a value of a usefulness indicator of each memory table entry of the plurality of memory table entries of the memory table as inversely correlating to a usefulness of the memory table entry. The computer-executable instructions additional cause the processor to select a least useful memory table entry of the plurality of memory table entries for replacement based on the interpreted value of the usefulness indicator of each memory table entry of the plurality of memory table entries of the memory table.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Figure 1:
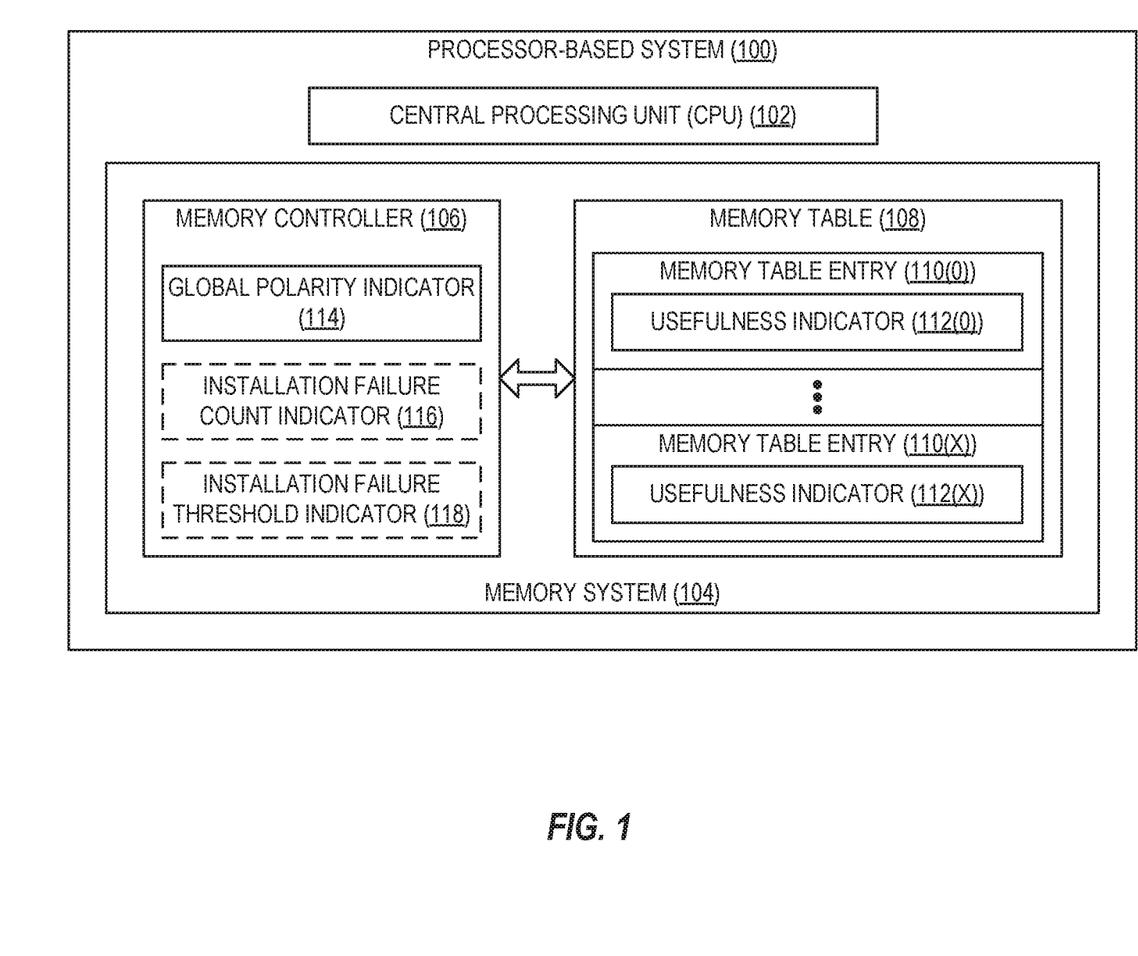
FIG. 1 is a block diagram of an exemplary processor-based system including a memory controller providing a global polarity indicator for variable interpretation of usefulness indicators.

Aspects disclosed in the detailed description include providing variable interpretation of usefulness indicators for memory tables in processor-based systems. In this regard, FIG. 1 illustrates an exemplary processor-based system 100 that includes a central processing unit (CPU) 102 and a memory system 104 comprising a memory controller 106. The memory system 104 according to some aspects may comprise or be part of a cache, a branch predictor, a value predictor, a load address predictor, and/or a hardware data prefetcher, as non-limiting examples. In such aspects, the memory controller 106 may comprise a cache controller, a branch predictor controller, a value predictor controller, a load address predictor controller, and/or a hardware data prefetch controller, respectively, as non-limiting examples. The memory system 104 may further comprise memory devices, such as static random access memory (SRAM) devices, as non-limiting examples.

It is to be understood that the processor-based system 100 of FIG. 1 may encompass any one of known digital logic elements, semiconductor circuits, and processing cores, and/or memory structures, among other elements, or combinations thereof. Aspects described herein are not restricted to any particular arrangement of elements, and the disclosed techniques may be easily extended to various structures and layouts on semiconductor dies or packages. It is to be further understood that some aspects of the processor-based system 100 may include elements in addition to those illustrated in FIG. 1. As non-limiting examples, the processor-based system 100 may include one or more graphical processing units (GPUs), one or more instruction caches, one or more data caches, one or more execution pipelines, one or more execution units, one or more completion units, and/or one or more registers.

As seen in FIG. 1, the memory system 104 includes a memory table 108 that stores a plurality of memory table entries 110(0)-110(X). The memory table 108 in some aspects may comprise an SRAM data table for storing state data. Each of the memory table entries 110(0)-110(X) includes a corresponding usefulness indicator 112(0)-112(X) that is used by the memory controller 106 for determining a usefulness of the memory table entry 110(0)-110(X) as part of implementing a replacement policy for the memory table 108. For example, if the memory controller 106 determines that replacement of one of the memory table entries 110(0)-110(X) is necessary, the memory controller 106 may be configured to select a memory table entry 110(0)-110(X) whose usefulness indicator 112(0)-112(X) indicates that the memory table entry 110(0)-110(X) is least useful among the memory table entries 110(0)-110(X). In this manner, the memory controller 106 attempts to minimize any impact on system performance that may result from replacement of one of the memory table entries 110(0)-110(X).

However, as noted above, the usefulness indicators 112(0)-112(X) themselves tend to become less useful over time as the memory table 108 becomes populated with memory table entries 110(0)-110(X) that all indicate that they are useful. While recalibration of the usefulness indicators 112(0)-112(X) (e.g., by shifting or flash-clearing all of the usefulness indicators 112(0)-112(X) in the memory table 108) can remedy this problem, such solutions require multiple memory table entries 110(0)-110(X) to be written within a very short period of time. As a result, these potential solutions may not be practicable when using memory devices such as SRAMs.

In this regard, the memory controller 106 of FIG. 1 provides a global polarity indicator 114 that determines how the memory controller 106 interprets and updates the usefulness indicators 112(0)-112(X) of the memory table entries 110(0)-110(X). In some aspects, the global polarity indicator 114 comprises a single-bit field that represents a Boolean value. When the global polarity indicator 114 is set (e.g., has a Boolean value of true), the memory controller 106 interprets the usefulness indicator 112(0)-112(X) in the conventional fashion, whereby a value of each of the usefulness indicators 112(0)-112(X) directly corresponds to the usefulness of the corresponding memory table entry 110(0)-110(X). Thus, a usefulness indicator 112(0)-112(X) having a higher value indicates a higher level of usefulness, and the usefulness indicator 112(0)-112(X) is incremented when the corresponding memory table entry 110(0)-110(X) proves valuable, and is decremented otherwise.

If the global polarity indicator 114 is not set (e.g., has a Boolean value of false), the memory controller 106 interprets the value of each usefulness indicator 112(0)-112(X) as inversely corresponding to the usefulness of the corresponding memory table entry 110(0)-110(X). A usefulness indicator 112(0)-112(X) having a higher value therefore is indicative of a lower level of usefulness, and the usefulness indicator 112(0)-112(X) is decremented when the corresponding memory table entry 110(0)-110(X) proves valuable, and is incremented otherwise. In this manner, the memory controller 106 selects memory table entries 110(0)-110(X) for replacement and updates the usefulness indicators 112(0)-112(X) based on the interpretation of the usefulness indicators 112(0)-112(X) indicated by the global polarity indicator 114. It is to be understood that, in some aspects, the global polarity indicator 114 may be considered to be "set" when storing a Boolean value of false and "not set" when storing a Boolean value of true.

In some aspects, the memory controller 106 is further configured to determine an optimal time to invert the value of the global polarity indicator 114 by tracking how many times an installation of a new memory table entry 110(0)-110(X) is successful versus how many installations fail (e.g., resulting in forfeiting placement of the new memory table entry 110(0)-110(X) or selecting a memory table entry 110(0)-110(X) that is indicated to be useful). In this regard, the memory controller 106 in such aspects provides an installation failure count indicator 116 that is incremented upon a failed attempt to install a new memory table entry 110(0)-110(X), and decremented upon a successful attempt to install a new memory table entry 110(0)-110(X). The memory controller 106 may further provide an installation failure threshold indicator 118, the value of which is set to indicate a maximum allowable number of failed installations. When the value of the installation failure count indicator 116 exceeds the value of the installation failure threshold indicator 118, the memory controller 106 is configured to invert the value of the global polarity indicator 114. As a non-limiting example, if the global polarity indicator 114 has a current Boolean value of true, the memory controller 106 sets the global polarity indicator 114 to a Boolean value of false, and vice versa. This has the effect of reversing the interpretation of the usefulness indicators 112(0)-112(X) by the memory controller 106, transforming the most useful memory table entries 110(0)-110(X) into the least useful.

Some aspects may provide that the performance of the memory controller 106 and the global polarity indicator 114 is enhanced by ensuring that the usefulness indicators 112(0)-112(X) of the memory table entries 110(0)-110(X) represent symmetric ranges of useful states and non-useful states. For example, for usefulness indicators 112(0)-112(X) having two (2) bits (and thus four (4) potential usefulness values), the performance of the memory controller 106 may be optimized where the four (4) potential usefulness values represent two (2) useful states and two (2) non-useful states.

Figure 2:
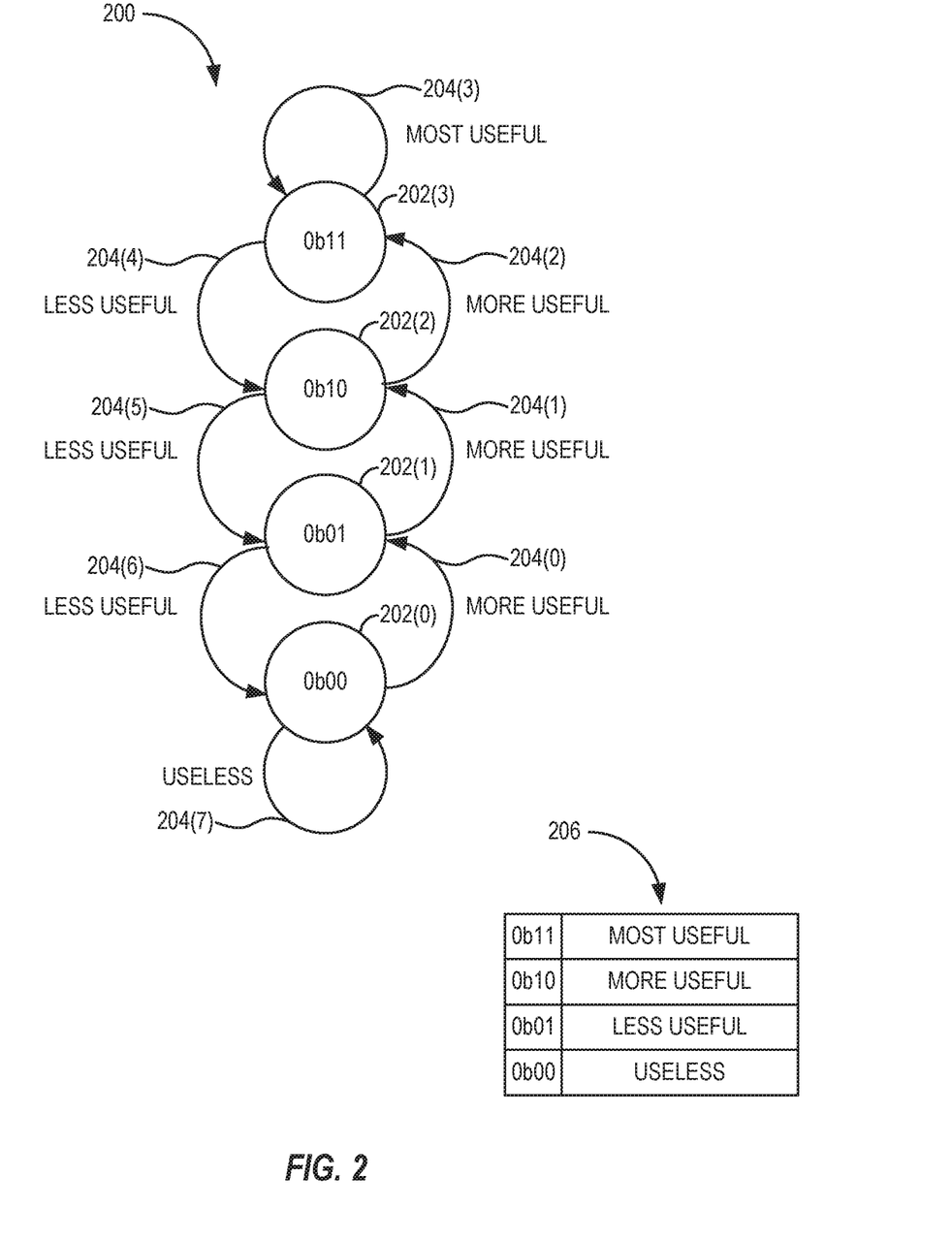
FIG. 2 is a state diagram illustrating how usefulness indicators are interpreted and updated by a conventional memory controller.
Figure 3:
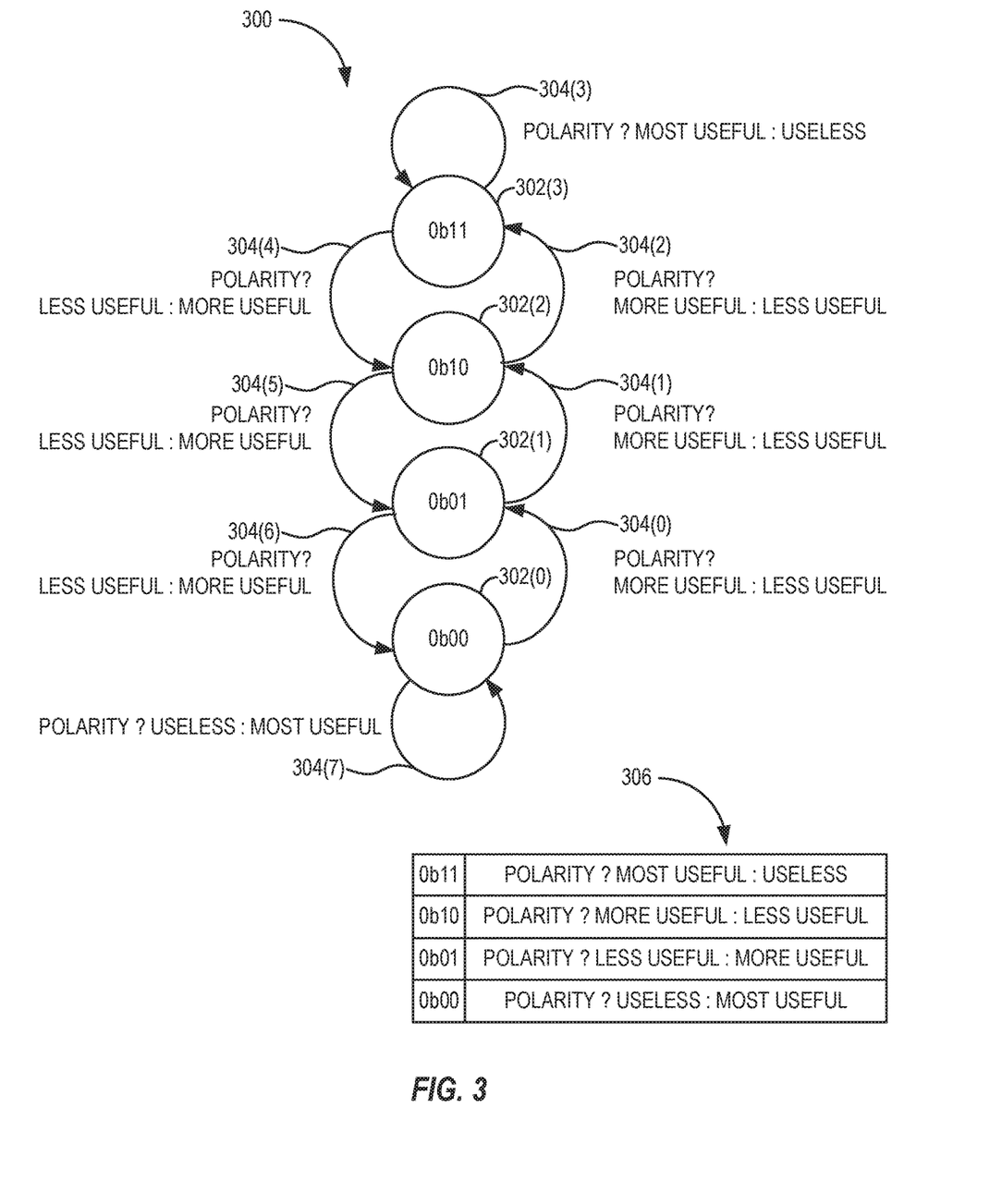
FIG. 3 is a state diagram illustrating how the memory controller of FIG. 1 uses the global polarity indicator of FIG. 1 to interpret and update usefulness indicators.

FIGS. 2 and 3 provide state diagrams to compare and contrast the manner in which the state of each of the usefulness indicators 112(0)-112(X) may be interpreted and updated by a conventional memory controller and the memory controller 106 of FIG. 1. In particular, FIG. 2 shows the potential states of the usefulness indicators 112(0)-112(X) and the transitions between states according to a conventional memory controller. FIG. 3 shows the possible states of the usefulness indicators 112(0)-112(X) and how they are interpreted and updated by the memory controller 106 based on the usefulness of the corresponding memory table entries 110(0)-110(X) and the value of the global polarity indicator 114. In both FIGS. 2 and 3, it is assumed that the usefulness indicators 112(0)-112(X) are bit fields storing two (2) bits each.

In FIG. 2, a state diagram 200 illustrates four possible states 202(0)-202(3) of each of the usefulness indicators 112(0)-112(X) of FIG. 1. As seen in FIG. 2, the four possible states 202(0)-202(3) have corresponding binary values of 0b00, 0b01, 0b10, and 0b11, with the allowable transitions between the states 202(0)-202(3) indicated by transition arrows 204(0)-204(7). A legend 206 indicates how the value of each of the states 202(0)-202(3) is interpreted by a conventional memory controller. In the example of FIG. 2, the binary value 0b00 is interpreted as "useless," while the binary value 0b01 is interpreted as "less useful," the binary value 0b10 as "more useful," and the binary value 0b11 as "most useful."

When a memory table entry of the plurality of memory table entries 110(0)-110(X) is determined by the conventional memory controller to be useful (e.g., in response to a correct prediction or prefetch suggestion), the value of the corresponding usefulness indicator 112(0)-112(X) is incremented. This results in a transition to a "more useful" state (as indicated by transition arrows 204(0)-204(3)) ultimately reaching the state 202(3) representing "most useful." Conversely, when the conventional memory controller judges a memory table entry of the plurality of memory table entries 110(0)-110(X) to be less useful, the value of the corresponding usefulness indicator 112(0)-112(X) is decremented, resulting in a transition to a "less useful" state (as shown by transition arrows 204(4)-204(7)) until the state 202(0) representing "useless" is reached.

FIG. 3, in contrast, shows how the memory controller 106 of FIG. 1 may vary the interpretation of the value of the usefulness indicators 112(0)-112(X) based on the value of the global polarity indicator 114 of FIG. 1. As seen in FIG. 3, a state diagram 300 comprises states 302(0)-302(3) that have corresponding binary values of 0b00, 0b01, 0b10, and 0b11, with possible transitions between the states 302(0)-302(3) indicated by transition arrows 304(0)-304(7). A legend 306 indicates how the value of each state 302(0)-302(3) is interpreted by the memory controller 106, depending on the global polarity indicator 114. The logic for determining how to interpret a given binary value is shown in FIG. 3 in the format "X?Y:Z," which is intended to be read as "if condition X is true, interpret as Y; otherwise, interpret as Z." Thus, if the global polarity indicator 114 is set (e.g., has a Boolean value of true), then the values of the states 302(0)-302(3) are interpreted in conventional fashion. The binary value 0b00 is interpreted as "useless," the binary value 0b01 as "less useful," the binary value 0b10 as "more useful," and the binary value 0b11 as "most useful." However, if the global polarity indicator 114 is not set (e.g., has a Boolean value of false), the interpretation of each binary value is reversed. As a result, the binary value 0b00 is interpreted as "most useful," the binary value 0b01 as "more useful," the binary value 0b10 as "less useful," and the binary value 0b11 as "useless."

In similar fashion, the transitions between the potential states 302(0)-302(3) for each of the usefulness indicators 112(0)-112(X) vary based on the value of the global polarity indicator 114 and the determined usefulness of the corresponding memory table entries 110(0)-110(X). In the example of FIG. 3, if the global polarity indicator 114 is set, the transitions between the states 302(0)-302(3) occur in the same manner as shown in FIG. 2. Thus, when a memory table entry of the plurality of memory table entries 110(0)-110(X) is determined by the memory controller 106 to be useful, the value of the corresponding usefulness indicator 112(0)-112(X) is incremented, resulting in a transition to a "more useful" state as shown by the transition arrows 304(0)-304(3). The value of the usefulness indicator 112(0)-112(X) corresponding to a less useful memory table entry 110(0)-110(X) is decremented, resulting in a transition to a "less useful" state as shown by the transition arrows 304(4)-304(7).

However, if the global polarity indicator 114 is not set, the memory controller 106 applies the reverse logic to state transitions. Consequently, when a memory table entry of the plurality of memory table entries 110(0)-110(X) is determined to be useful, the value of the corresponding usefulness indicator 112(0)-112(X) is decremented, resulting in a transition to a "more useful" state as shown by the transition arrows 304(4)-304(7). Likewise, the value of the usefulness indicator 112(0)-112(X) corresponding to a less useful memory table entry 110(0)-110(X) is incremented, resulting in a transition to a "less useful" state as shown by the transition arrows 304(0)-304(3).

Figure 4:
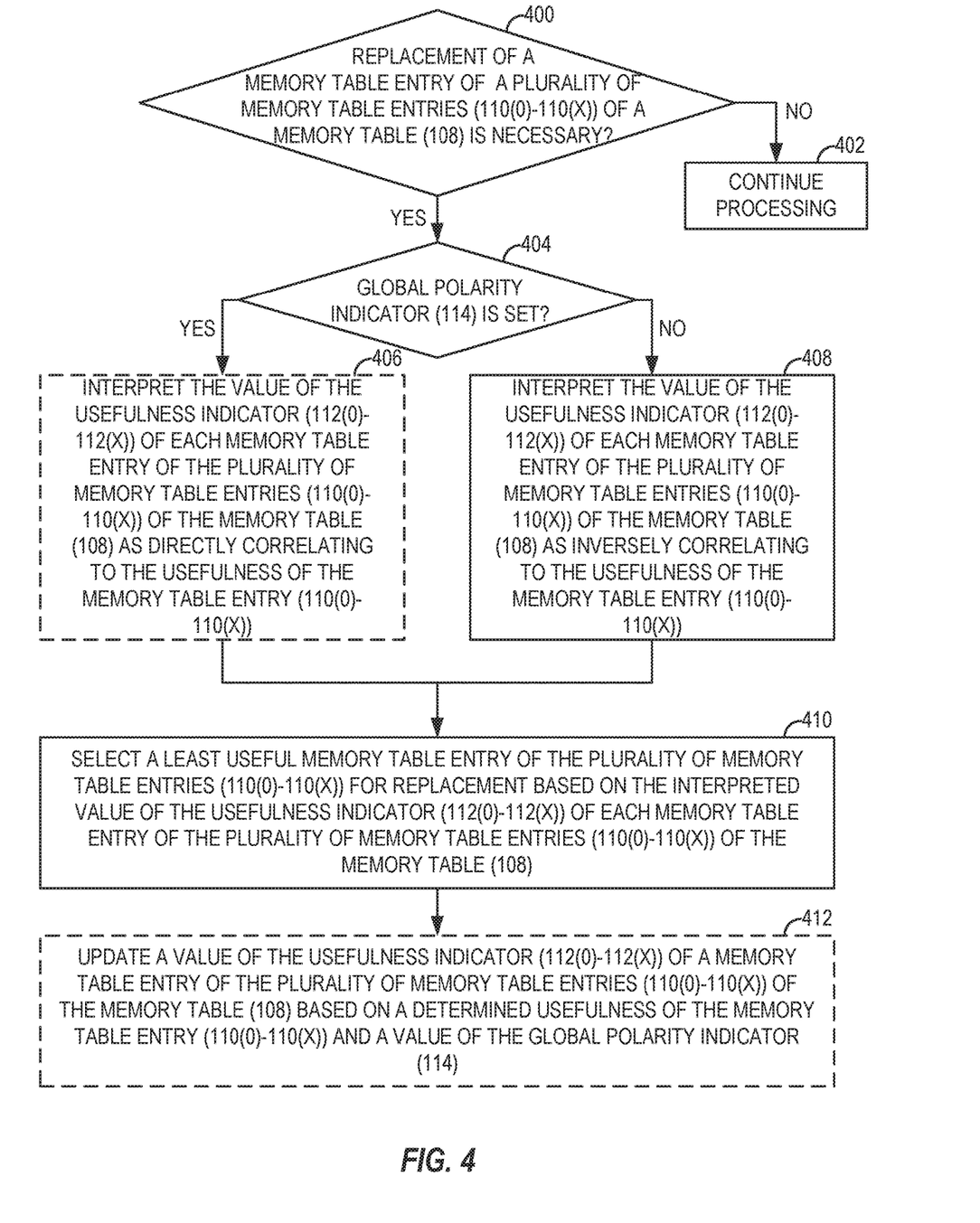
FIG. 4 is a flowchart illustrating exemplary operations for providing variable interpretation of usefulness indicators by the memory controller of FIG. 1 using the global polarity indicator of FIG. 1.

FIG. 4 is a flowchart illustrating exemplary operations for providing variable interpretation of usefulness indicators by the memory controller 106 of FIG. 1 using the global polarity indicator 114 of FIG. 1. In describing FIG. 4, elements of FIG. 1 are referenced for the sake of clarity. In FIG. 4, operations begin with the memory controller 106 determining whether replacement of a memory table entry of the plurality of memory table entries 110(0)-110(X) of the memory table 108 is necessary (block 400). In this regard, the memory controller 106 may be referred to herein as "a means for determining that replacement of a memory table entry of a plurality of memory table entries of a memory table is necessary." The operations of block 400 for determining whether replacement of one of the memory table entries 110(0)-110(X) may be based on conventional techniques for applying a replacement policy by the memory controller 106. If replacement is not necessary, processing continues (block 402).

However, if the memory controller 106 determines at decision block 400 that replacement of a memory table entry of the plurality of memory table entries 110(0)-110(X) is necessary, the memory controller 106 next determines whether the global polarity indicator 114 is set (block 404). Accordingly, the memory controller 106 may be referred to herein as "a means for determining whether a global polarity indicator is set, responsive to determining that replacement of a memory table entry is necessary." According to some aspects, if the global polarity indicator 114 is set, the memory controller 106 will interpret a value of a usefulness indicator 112(0)-112(X) of each memory table entry of the plurality of memory table entries 110(0)-110(X) of the memory table 108 as directly correlating to the usefulness of the memory table entry 110(0)-110(X) (block 406). If the memory controller 106 determines at decision block 404 that the global polarity indicator 114 is not set, the memory controller 106 will interpret the value of the usefulness indicator 112(0)-112(X) of each memory table entry of the plurality of memory table entries 110(0)-110(X) of the memory table 108 as inversely correlating to the usefulness of the memory table entry 110(0)-110(X) (block 408). The memory controller 106 thus may be referred to herein as "a means for interpreting a value of a usefulness indicator of each memory table entry of the plurality of memory table entries of the memory table as inversely correlating to a usefulness of the memory table entry, responsive to determining that the global polarity indicator is not set."

After determining how to interpret the usefulness indicator 112(0)-112(X) of each memory table entry of the plurality of memory table entries 110(0)-110(X), the memory controller 106 then selects a least useful memory table entry of the plurality of memory table entries 110(0)-110(X) for replacement based on the interpreted value of the usefulness indicator 112(0)-112(X) of each memory table entry of the plurality of memory table entries 110(0)-110(X) of the memory table 108 (block 410). In this regard, the memory controller 106 may be referred to herein as "a means for selecting a least useful memory table entry of the plurality of memory table entries for replacement based on the interpreted value of the usefulness indicator of each memory table entry of the plurality of memory table entries of the memory table." As a non-limiting example, the "least useful" memory table entry of the plurality of memory table entries 110(0)-110(X) may comprise a memory table entry of the plurality of memory table entries 110(0)-110(X) having a usefulness indicator 112(0)-112(X) with a value closest to the "useless" value as determined based on the global polarity indicator 114. Some aspects of the memory controller 106 may be further configured to update a value of the usefulness indicator 112(0)-112(X) of a memory table entry of the plurality of memory table entries 110(0)-110(X) of the memory table 108 based on a determined usefulness of the memory table entry 110(0)-110(X) and a value of the global polarity indicator 114 (block 412).

Figure 5:
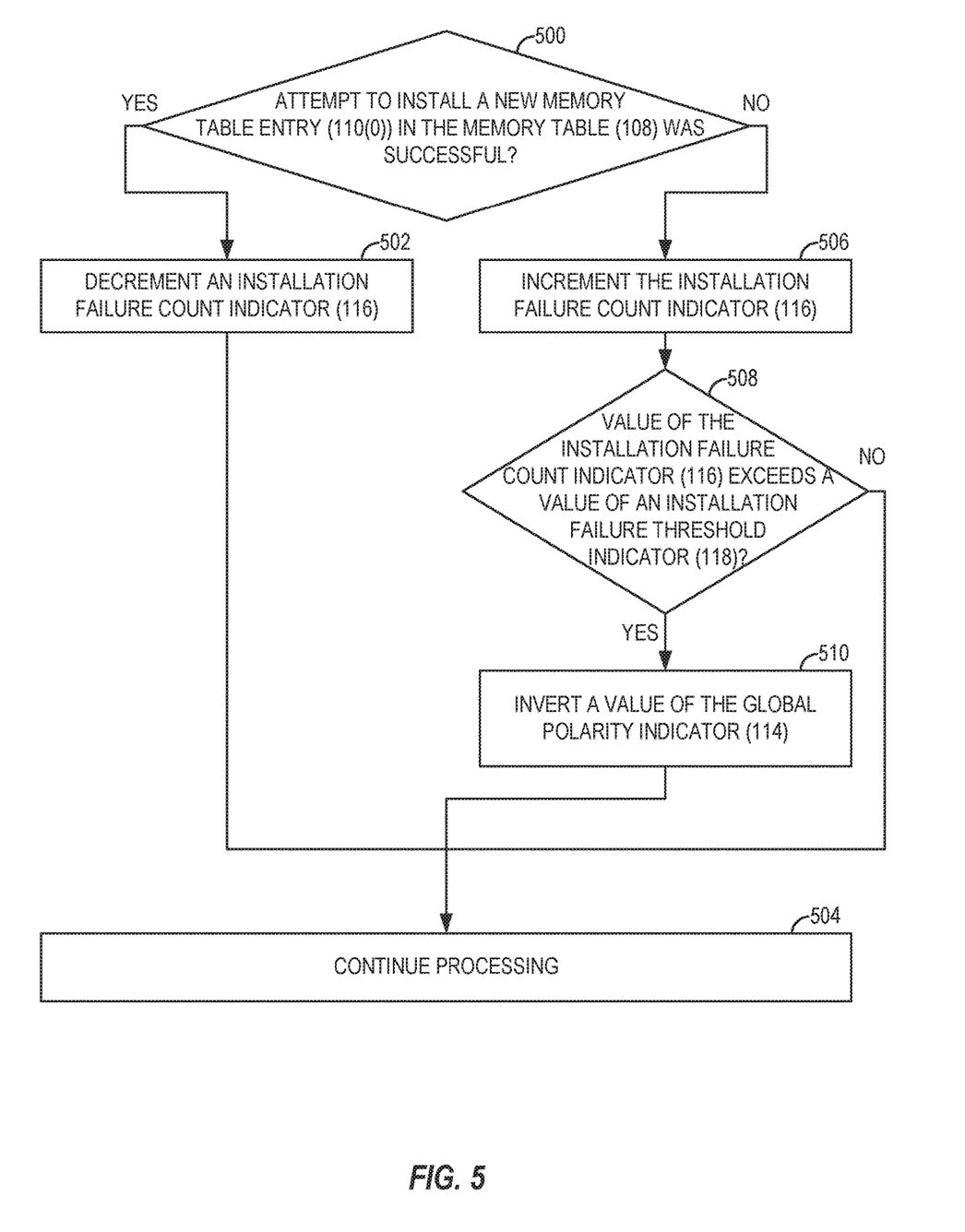
FIG. 5 is a flowchart illustrating additional exemplary operations of the memory controller of FIG. 1 for determining when to invert a value of the global polarity indicator of FIG. 1.

As noted above, to maintain the usefulness of the usefulness indicators 112(0)-112(X) themselves, the value of the global polarity indicator 114 may be inverted to reverse how the usefulness indicators 112(0)-112(X) are interpreted by the memory controller 106. To illustrate exemplary operations of the memory controller 106 for determining when to invert the value of the global polarity indicator 114, FIG. 5 is provided. For the sake of clarity, elements of FIG. 1 are referenced in describing FIG. 5. Operations in FIG. 5 begin with the memory controller 106 determining whether an attempt to install a new memory table entry, such as the memory table entry 110(0), in the memory table 108 was successful (block 500). If so, the memory controller 106 decrements the installation failure count indicator 116 (block 502). Processing then continues at block 504. However, if the memory controller 106 determines at decision block 500 that the attempt to install the new memory table entry 110(0) in the memory table 108 was not successful, the memory controller 106 increments the installation failure count indicator 116 (block 506). The memory controller 106 then determines whether a value of the installation failure count indicator 116 exceeds a value of the installation failure threshold indicator 118 (block 508). If not, processing continues at block 504. If the value of the installation failure count indicator 116 is determined at decision block 508 to exceed the value of the installation failure threshold indicator 118, the memory controller 106 inverts a value of the global polarity indicator 114 (block 510). Consequently, from this point forward, the memory controller 106 will reverse its interpretation of the usefulness indicators 112(0)-112(X) relative to how the usefulness indicators 112(0)-112(X) were interpreted prior to inverting the global polarity indicator 114. Processing then continues (block 504).

Providing variable interpretation of usefulness indicators for memory tables in processor-based systems according to aspects disclosed herein may be provided in or integrated into any processor-based system. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
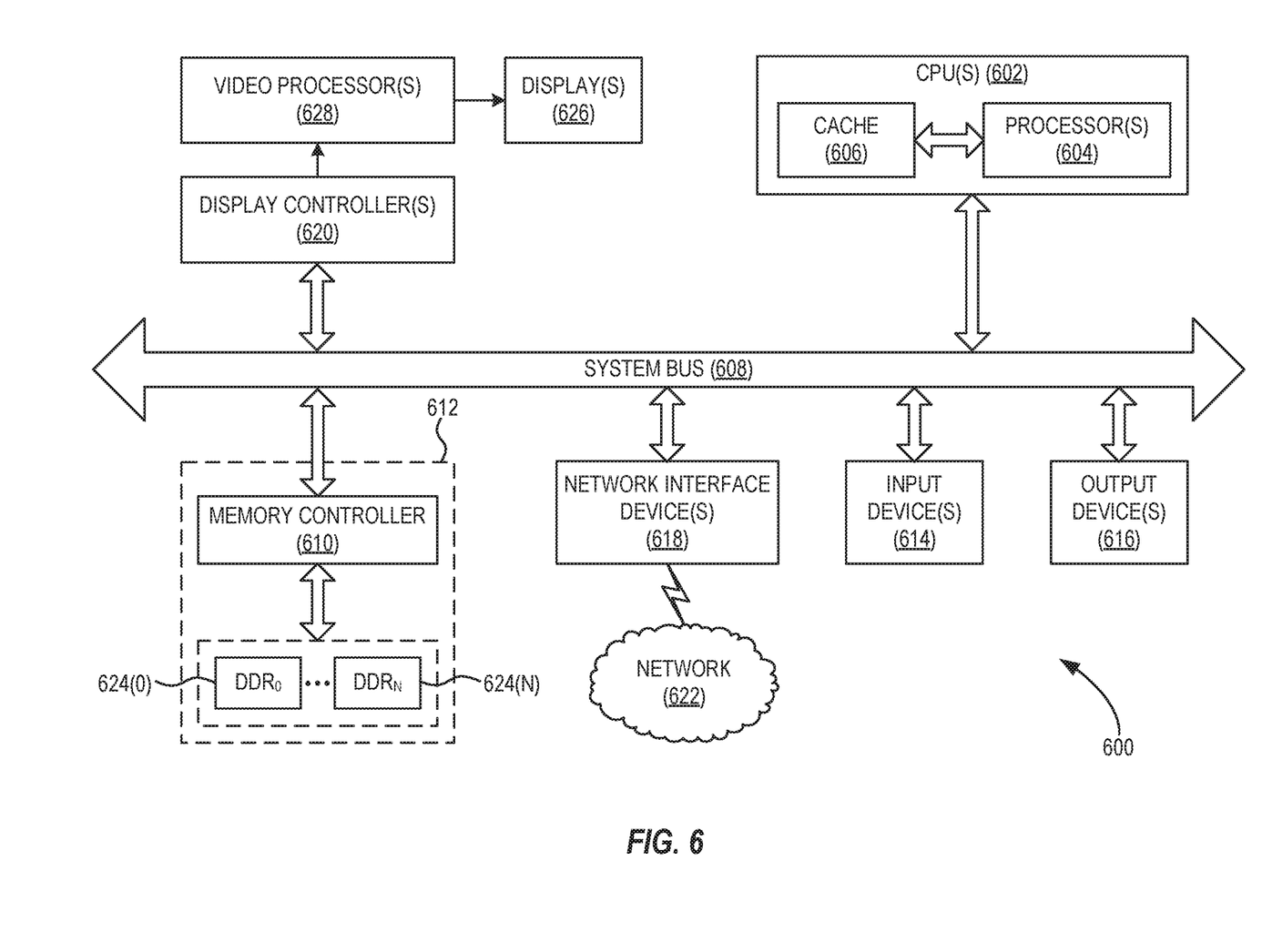
FIG. 6 is a block diagram of an exemplary processor-based system that can include the memory controller and the global polarity indicator of FIG. 1.

In this regard, FIG. 6 illustrates an example of a processor-based system 600 that corresponds to the processor-based system 100 of FIG. 1. The processor-based system 600 includes one or more CPUs 602, each including one or more processors 604. The CPU(s) 602 may have cache memory 606 that is coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 (which corresponds to the memory controller 106 of FIG. 1) as an example of a slave device.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0)-624(N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A memory system of a processor-based system, comprising:
    a memory table comprising a plurality of memory table entries each comprising a usefulness indicator; and
    a memory controller comprising a global polarity indicator comprising a bit field representing a Boolean value;
    the memory controller configured to, responsive to determining that replacement from the memory table is necessary:
        determine whether the global polarity indicator is not set to indicate a value of true;
        responsive to determining that the global polarity indicator is not set to indicate a value of true, interpret a value of the usefulness indicator of each memory table entry of the plurality of memory table entries of the memory table as inversely correlating to a usefulness of the memory table entry;
        responsive to determining that the global polarity indicator is set to indicate a value of true, interpret the value of the usefulness indicator of each memory table entry of the plurality of memory table entries of the memory table as directly correlating to the usefulness of the memory table entry; and
        select a least useful memory table entry of the plurality of memory table entries for replacement based on the interpreted value of the usefulness indicator of each memory table entry of the plurality of memory table entries of the memory table.

2. The memory system of claim 1, wherein the memory controller is further configured to update a value of the usefulness indicator of a memory table entry of the plurality of memory table entries of the memory table based on a determined usefulness of the memory table entry and a value of the global polarity indicator.

3. The memory system of claim 1, wherein:
    the memory controller further comprises an installation failure count indicator; and
    the memory controller is further configured to:
        increment the installation failure count indicator responsive to a failed attempt to install a new memory table entry in the memory table; and
        decrement the installation failure count indicator responsive to a successful attempt to install the new memory table entry in the memory table.

4. The memory system of claim 3, wherein:
    the memory controller further comprises an installation failure threshold indicator; and
    the memory controller is further configured to:
        determine whether a value of the installation failure count indicator exceeds a value of the installation failure threshold indicator; and
        responsive to the value of the installation failure count indicator exceeding the value of the installation failure threshold indicator, invert a value of the global polarity indicator.

5. The memory system of claim 1, wherein the usefulness indicator of each memory table entry of the plurality of memory table entries of the memory table represents symmetric ranges of useful states and non-useful states.

6. The memory system of claim 1, comprising a static random access memory (SRAM).

7. The memory system of claim 1 integrated into an integrated circuit (IC).

8. The memory system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A memory system of a processor-based system, comprising:
   a means for determining that replacement of a memory table entry of a plurality of memory table entries of a memory table is necessary;
   a means for determining whether a global polarity indicator, comprising a bit field representing a Boolean value, is not set to indicate a value of true, responsive to determining that replacement of a memory table entry is necessary;
   a means for interpreting a value of a usefulness indicator of each memory table entry of the plurality of memory table entries of the memory table as inversely correlating to a usefulness of the memory table entry, responsive to determining that the global polarity indicator is not set to indicate a value of true; and
   a means for selecting a least useful memory table entry of the plurality of memory table entries for replacement based on the interpreted value of the usefulness indicator of each memory table entry of the plurality of memory table entries of the memory table.

10. A method for providing variable interpretation of memory table usefulness indicators, comprising:
   determining, by a memory controller of a processor-based system, that replacement of a memory table entry of a plurality of memory table entries of a memory table is necessary; and
   responsive to determining that replacement of a memory table entry is necessary:
      determining whether a global polarity indicator comprising a bit field representing a Boolean value is not set to indicate a value of true;
      responsive to determining that the global polarity indicator is not set to indicate a value of true, interpreting a value of a usefulness indicator of each memory table entry of the plurality of memory table entries of the memory table as inversely correlating to a usefulness of the memory table entry; and
      selecting a least useful memory table entry of the plurality of memory table entries for replacement based on the interpreted value of the usefulness indicator of each memory table entry of the plurality of memory table entries of the memory table.

11. The method of claim 10, further comprising, responsive to determining that the global polarity indicator is set to indicate a value of true, interpreting the value of the usefulness indicator of each memory table entry of the plurality of memory table entries of the memory table as directly correlating to the usefulness of the memory table entry.

12. The method of claim 10, further comprising updating a value of the usefulness indicator of a memory table entry of the plurality of memory table entries of the memory table based on a determined usefulness of the memory table entry and a value of the global polarity indicator.

13. The method of claim 10, further comprising:
   incrementing an installation failure count indicator responsive to a failed attempt to install a new memory table entry in the memory table; and
   decrementing the installation failure count indicator responsive to a successful attempt to install the new memory table entry in the memory table.

14. The method of claim 13, further comprising:
   determining whether a value of the installation failure count indicator exceeds a value of an installation failure threshold indicator; and
   responsive to the value of the installation failure count indicator exceeding the value of the installation failure threshold indicator, inverting a value of the global polarity indicator.

15. The method of claim 10, wherein the usefulness indicator of each memory table entry of the plurality of memory table entries of the memory table represents symmetric ranges of useful states and non-useful states.

16. A non-transitory computer-readable medium having stored thereon computer-executable instructions which, when executed by a processor, cause the processor to:
   determine that replacement of a memory table entry of a plurality of memory table entries of a memory table is necessary; and
   responsive to determining that replacement of a memory table entry is necessary:
      determine whether a global polarity indicator comprising a bit field representing a Boolean value is not set to indicate a value of true;
      responsive to determining that the global polarity indicator is not set to indicate a value of true, interpret a value of a usefulness indicator of each memory table entry of the plurality of memory table entries of the memory table as inversely correlating to a usefulness of the memory table entry; and
      select a least useful memory table entry of the plurality of memory table entries for replacement based on the interpreted value of the usefulness indicator of each memory table entry of the plurality of memory table entries of the memory table.

17. The non-transitory computer-readable medium of claim 16 having stored thereon computer-executable instructions which, when executed by a processor, further cause the processor to, responsive to determining that the global polarity indicator is set to indicate a value of true, interpret the value of the usefulness indicator of each memory table entry of the plurality of memory table entries of the memory table as directly correlating to the usefulness of the memory table entry.

18. The non-transitory computer-readable medium of claim 16 having stored thereon computer-executable instructions which, when executed by a processor, further cause the processor to update a value of the usefulness indicator of a memory table entry of the plurality of memory table entries of the memory table based on a determined usefulness of the memory table entry and a value of the global polarity indicator.

19. The non-transitory computer-readable medium of claim 16 having stored thereon computer-executable instructions which, when executed by a processor, further cause the processor to:
   increment an installation failure count indicator responsive to a failed attempt to install a new memory table entry in the memory table; and
   decrement the installation failure count indicator responsive to a successful attempt to install the new memory table entry in the memory table.

20. The non-transitory computer-readable medium of claim 19 having stored thereon computer-executable instructions which, when executed by a processor, further cause the processor to:
- determine whether a value of the installation failure count indicator exceeds a value of an installation failure threshold indicator; and
- responsive to the value of the installation failure count indicator exceeding the value of the installation failure threshold indicator, invert a value of the global polarity indicator.

\* \* \* \* \*